NOVEL ANTIREFLECTION COATINGS FOR SEMICONDUCTOR DEVICES

Filed March 15, 1967

INVENTOR
STANLEY HARRISON
BY Francis J. Thornton
ATTORNEY

United States Patent Office 3,539,883
Patented Nov. 10, 1970

3,539,883
ANTIREFLECTION COATINGS FOR SEMICONDUCTOR DEVICES

Stanley Harrison, Bedford, Mass., assignor to Ion Physics Corporation, Burlington, Mass., a corporation of Delaware Filed Mar. 15, 1967, Ser. No. 623,439
Int. Cl. H01l 15/04
U.S. Cl. 317—234 7 Claims

ABSTRACT OF THE DISCLOSURE

This invention teaches that solar cells can be made to absorb and utilize more of the solar spectrum, in which such cells have peak efficiency, by applying a coating of cerium oxide between the cell and its cover slip.

BACKGROUND OF THE INVENTION

This invention relates generally to semiconductor devices and more particularly to an improved type of solid state device such as a solar cell which has been covered with an antireflection coating to permit the cell to utilize more of the comparatively narrow region of the solar spectrum in which such devices have peak efficiency.

Generally, prior art solar cells consist of a slice of 7 to 13 ohm centimeter 12 mils thick, P type silicon into which there has been diffused sufficient phosphorous to convert the top 0.5 micron layer of the slice to an N type material. This diffusion creates at the PN interface a rectifying junction. When light particles, hereinafter called photons, are absorbed in such a crystal, hole-electron pairs are generated which cross the junction. Displacement of these created charges establishes a voltage across the junction. Through the use of appropriate contacts, to the P and N regions, the cell can be used as a battery.

The reflectivity of the silicon surface is such that about 35% of the photons incident on the cell surface suffer reflection and are lost. To eliminate this loss an 800 angstrom (A.) thick outer reflection layer of silicon monoxide is deposited on the cell surface. This layer reduces the reflections of photons in the peak response area and the average cell air mass zero solar efficiency increases from 8.5% to 10.5%.

High energy, incident, charged particles such as electrons and protons rapidly degrade these cells and it is necessary to protect these cells by mounting quartz cover slips over the monoxide layer. These cover slips at the present time range in thickness from 0.006 inch to 0.020 inch and are secured to the cell surface by a several mil thick coating of a room temperature vulcanizing silicone (RTV) cement. The application of this cover slip-cement combination disrupts the antireflective effectiveness of the monoxide coating such that the overall cell efficiency drops by about 1%. This decrease in cell efficiency is considered necessary by the prior art in order to obtain the increase in cell life time.

The present inventor, however, discovered that the introduction of this cover slip actually creates significant loss in the efficiency of the cell by increasing losses in the peak response area but because it simultaneously decreases the losses at the ends of the spectrum by an amount which approximately equals the increase in loss in the center of the spectrum the overall loss appears very small. Apparently workers in the prior art observed only the overall decrease and this misled them to believe the efficiency of the cell was only slightly affected by the introduction of the cement-cover slip combination.

The studies of the present inventor lead to the finding that there is an actual significant loss in the peak response region which in turn brought the inventor to the discovery of the means whereby the efficiency of such cells can be raised.

Thus the present invention is directed towards a new improved, more efficient solar cell.

SUMMARY OF THE INVENTION

Broadly speaking the advantages and features of the present invention are realized through the use of a deposited antireflective coating or layer which matches the solid state base material to a second coating or layer which in the instant application is described as the cover slip-cement combination such that the reflective losses in the peak response region of the devices are substantially reduced or eliminated.

BRIEF DESCRIPTION OF THE DRAWINGS

All the features and advantages of the present invention will be more fully realized and appreciated from the following description taken in conjunction with the accompanying drawings wherein.

DESCRIPTION OF THE PREFERRED EMBODIMENTS

Figure 1:
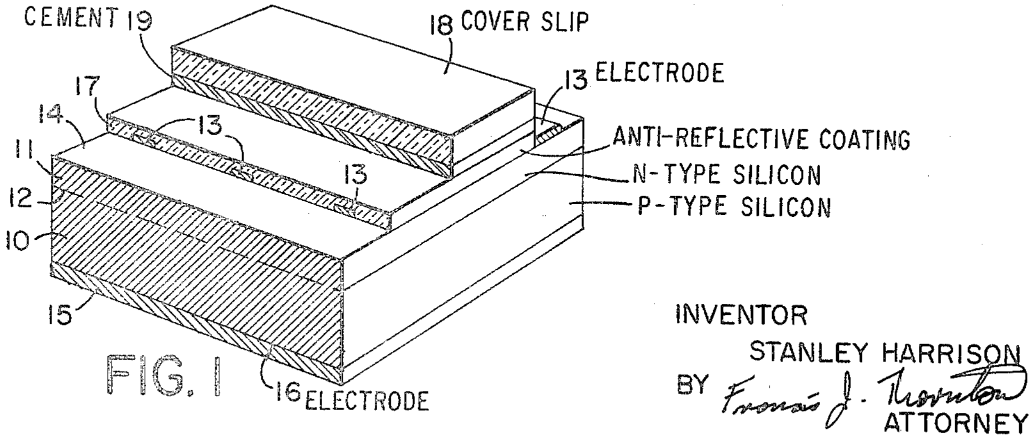
FIG. 1 shows in section one of the embodiments of the present invention.

Referring now to the figures and more particularly to FIG. 1, there is shown a solar cell which comprises a 0.012 inch thick body 10, of 7 to 13 ohm P type silicon, which has had a 0.5 micron thick surface layer 11 converted to N type material such that a PN junction 12 is created in the body 10. Region 11 may be produced by diffusing N type impurities, such as phosphorus, into the body in sufficient quantity to convert the conductivity type of region 11 and change its sheet resistivity to about 90 ohms per square.

Following creation of region 11 a digitated electrode 13 is produced on the exposed surface 14 which overlies region 11 and a continuous electrode 15 disposed on the opposite surface 16 of body 10.

Although the cell is useable as a photo-voltaic source at this point in its manufacture, experience dictates that improved results can be obtained by depositing on the surface 14 an antireflective coating 17 and a cover slip 18. The prior art produced coating 17 by vacuum evaporating a layer of silicon monoxide onto surface 14 and secured the cover slip thereto by an intermediate layer of RTV cement 19.

Figure 2:
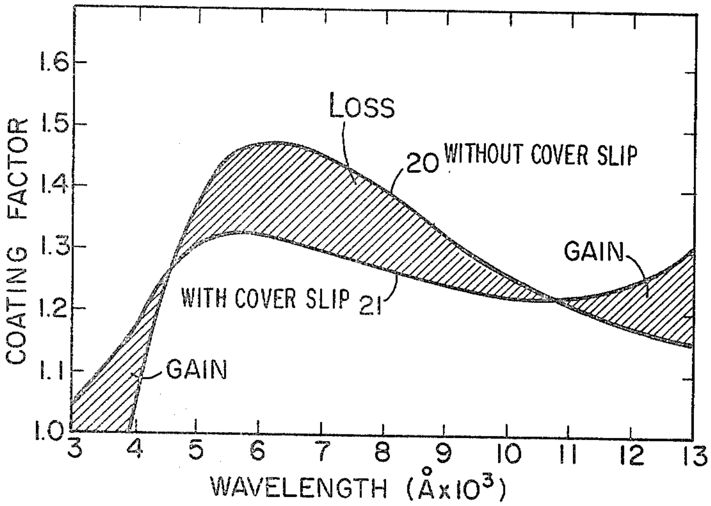
FIG. 2 PRIOR ART
FIG. 2 shows the response curve of a silicon solar cell produced by the prior art.

The inventor, however, discovered that although the silicon monoxide coating improves the response of the device the cover slip reduces it. This discovery of the inventor is shown in FIG. 2 which illustrates how the cell response is affected by the introduction of a cover slip over the antireflecting silicon monoxide coating. Coating factor as used herein is defined as the ratio of the response of the coated and cover slipped cell at a given wave length to the response of the uncoated cell. Curve 20 illustrates the response of a solar cell after an antireflection coating of silicon monoxide has been deposited on its radiation sensitive surface and curve 21 illustrates the response of the same cell following the cementing of a cover slip thereto. It can be seen from a comparison of these curves that although the coating factor is reduced by the cover slip in the central response area it is improved at the spectrum ends. Calculations have shown the gains at the spectrum ends approximates the loss in the center region and the overall efficiency of the cell is only reduced about 1%.

Through a careful study and detailed analysis the inventor determined that more efficient units could be produces if the cover slip were applied to the unit such that the gain at the spectrum ends was retained and the peak response loss in the spectrum center reduced or eliminated. In arriving at this conclusion, the present inventor determined that since the actual internal response to sunlight, of such cells, is most efficient in the yellow (6000 A.) range of the color spectrum any anti-reflective coating and cover slip combination must enhance, as much as possible, the 6000 A. wave length responses of the cell.

Such a coating cement-cover slip combination should perform the following functions:

(a) It should be antireflective in the wave length from 0.35 micron to 1.2 microns.

(b) It should be highly emissive in the wave length from 4 microns up.

(c) It should be thick enough to afford protection against solar protons and Van Allen particles.

Layers of quartz or aluminum dioxide have been found to be particularly suited to act as a protective means against solar and Van Allen particles. Therefore, since most users of solar cells desire such quartz cover slips it was determined that the use of this material would be continued and studies undertaken to improve the antireflective coating. Quartz is used as a cover slip in such applications because it satisfies two of the above functions and has other desirable characteristics. In particular it is emissive beyond 4 microns, and therefore heat rejective at 25° C., has a transmissivity cut off below 0.35 micron and is readily available in sheets thick enough to afford protection against solar and Van Allen particles.

Studies showed that for 100% transmission at the antireflective peak wave length, in the case of solar cells about 6000 A., the ideal index of refraction of the antireflective coating 17 equals the square root of the product of the indices of refraction of the materials between which it is incorporated. Thus, mathematically speaking $$N_2 = N_1 \times N_3$$

where $N_2$ is the index of refraction of the antireflective coating, $N_1$ the index of refraction of the cover slip and/or cement, and $N_3$ the index of refraction of the body 10. With quartz as the cover slip and silicon as the body the indices of refraction are, at 6000 A., approximately 1.45 and 4.0 respectively. Thus for this wave length the antireflective coating 17 should have an index of refraction of approximately 2.4.

It was further determined the optical thickness of the antireflective coating 17 should have one quarter of the wave length of the peak of a curve which is the product of the solar photon vs. wave length curve and the absolute photon response vs. wave length curve of the cell. In detail, to find this thickness, one would first plot the solar photon vs. wave length, the absolute photon response vs. wave length curve of the uncoated cell and the curve which is the product of these two curves. Once this product curve is set up one need only find the wave length at which this product curve peaks; one-quarter of this is the desired optical thickness of the antireflective coating 17. With this thickness, maximum transmission of the most efficient wave length is obtained. For the described cell the best thickness of coating 17 was found to be about 680 A.

By analysis of the foregoing facts and determinations the inventor discovered that control of the thickness of the antireflecting coating and proper matching of the various refractive indices produces cell which have lower reflective losses and are more efficient than prior art cells.

A number of materials such as titania, cerium oxide, silicon carbide, and zirconia, which have an index of refraction near the desired value, were considered. Of these cerium oxide was found to be the best. The other materials considered each had drawbacks which mitigated against their use. For example, titania was considered but found to be highly absorbing between 4000 A. and 4500 A.

It should be understood however than in certain circumstances or in special applications any one of the other materials might be more desirable.

Cerium oxide was chosen because its optical transmission was good over the response range of the cell and it was highly adherent to the silicon surface 14 and to the electrodes 12.

Various techniques have been developed for depositing this cerium oxide layer onto surface 14. One method comprises the mounting of the cells to be coated on a base plate after it is placed in any suitable evaporation apparatus together with a charge of powdered cerium oxide contained in a tungsten boat. The base plate carrying the cell and the tungsten boat carrying the charge are separated by a suitable shutter mechanism. The apparatus is then evacuated until a suitable vacuum level typically between $1 \times 10^{-5}$ and $4 \times 10^{-5}$ torr is reached. At this time a current is passed through the tungsten boat until the cerium oxide charge is heated to about 2300° C. at which temperature the charge evaporates. To assure good adherence and proper refractive index of the cerium oxide to the silicon surface the cell being coated is heated to about 300° C. By any suitable means such as a Sloan Thickness Monitor or by optical thickness determination, the shutter separating the cell from the source is closed only when an appropriate thickness, for most cells about 680 A., of cerium oxide has been deposited on the surface 14 of the unit.

Figure 3:
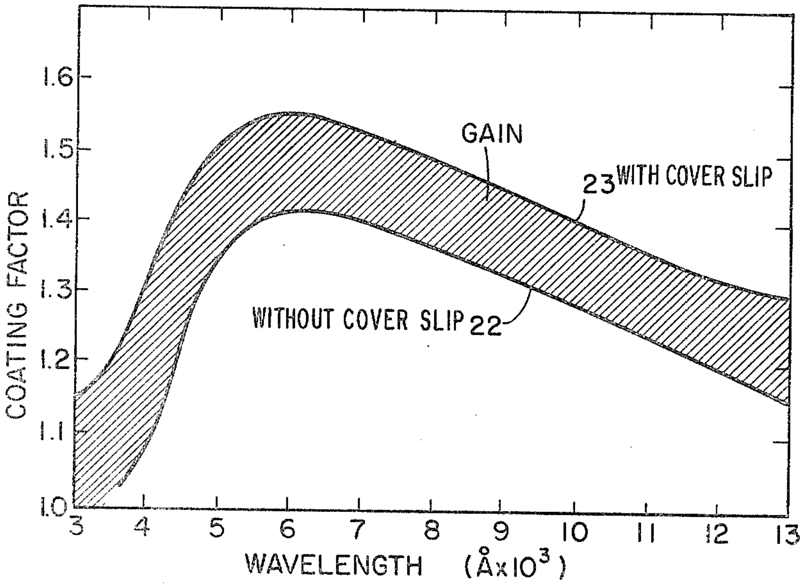
FIG. 3 shows the response curve of a silicon cell produced using the present invention.

If the cell is now tested with only the cerium oxide antireflecting coating thereon it does not appear to be an improvement over the prior art. This is to be expected, however, because this material was selected on the assumption that a quartz cover slip would be used therewith. Thus following the deposition of the antireflective coating and before use of the cell, a cover slip of refactive index about 1.5, with or without clear glue of index about 1.5, must be placed over the coating. In FIG. 3 curve 22 shows the response of a cerium coated cell without a cover slip and curve 23 shows the same cell after a quartz cover slip has been added. A comparison of curve 23 with curve 21 at FIG. 2 shows the improvement of efficiency that can be realized through the use of the present invention.

This cover slip may be added using the prior art techniques. That is, it may be bonded to the antireflective coating 17 by an epoxy or silicon layer having a refractive index about 1.5.

This invention will also be useful with solid state devices which otherwise use, generate or transmit light such as lasers or photo-conductors. Since the base material used for such devices may be gallium arsenide, cadmium sulfide or germanium instead of silicon, the material used for the intermediate layer might be different from those listed. In any event it would have the requirement that its index of refraction be equal to the square root of the product of the index of refraction of the semiconductor and the other index of refraction.

Having now described the various features and advantages of the present invention and since other means, methods and units may become apparent to those skilled in the art it is desired that this invention be limited only by the following claims.

I claim:

1. A light-transmitting semiconductor device comprising a body of solid state semiconductor material having a rectifying junction in said body, a coating disposed over at least a portion of the surface of said body, and a cover slip disposed over said coating, said body having an index of refraction at a selected wavelength of light, said cover slip having a lower index of refraction at said wavelength, said coating having at said wavelength an index of refraction substantially equal to the square root of the product of the said indices of refraction of the cover slip and the body, and said coating having an optical thickness equal to an odd multiple of a quarter of the wavelength of the light to be transmitted through said cover slip and said coating.

2. The device of claim 1 wherein said coating is selected from the group consisting of cerium oxide, silicon carbide, titanium dioxide and zirconium oxide.

3. The device of claim 1 wherein said cover slip is selected from the group consisting of quartz and aluminum dioxide.

4. The device of claim 1 wherein said coating has an optical thickness equal to an odd multiple of a quarter of the wavelength at which a composite curve, which is the product of the solar photon versus wavelength curve and the absolute photon response versus wavelength curve of said solid state body, peaks.

5. The device of claim 1 wherein said body is composed of silicon having a P region and an N region therein with a digitated electrode on one of said regions and an electrode on the other of said regions, said coating comprises an antireflective material disposed over and between the digitated electrode, said cover slip comprises a cover slip-cement combination, said cement being in the form of a layer separating and securing said cover slip to said coating, said cover slip-cement combination having substantially the same index of refraction at 6000 A., which is lower than the index of refraction of said silicon body at 6000 A., said coating having an index of refraction intermediate to the index of refraction of said cover slip-cement combination and the index of refraction of said body at 6000 A. and substantially equal to the square root of the product of the indices of refraction of the cover slip-cement combination and the body and an optical thickness equal to an odd multiple of a quarter of the wavelength of the peak of a composite curve which is the product of the solar photon versus wavelength curve and the absolute photon response versus wavelength curve of said silicon body.

6. The device of claim 5 wherein said coating is cerium oxide.

7. The device of claim 6 wherein said coating has a thickness of about 680 A.

References Cited

UNITED STATES PATENTS

| | | | |
|---|---|---|---|
| 3,047,439 | 7/1962 | Van Daal et al. | 148—33 |
| 3,248,669 | 4/1966 | Dumke et al. | 331—94.5 |
| 3,293,513 | 12/1966 | Biard et al. | 317—237 |
| 3,350,595 | 10/1967 | Kramer | 313—94 |
| 3,390,022 | 6/1968 | Fa | 148—33 |
| 3,391,308 | 7/1968 | Miller | 317—235 |

FOREIGN PATENTS

| | | |
|---|---|---|
| 951,859 | 3/1964 | Great Britain. |

OTHER REFERENCES

Hilibrand: "Gallium Arsenide," pp. 53–57, of RCA Engineer, February-March 1963, vol. 8, No. 5.

JOHN W. HUCKERT, Primary Examiner

R. F. POLISSACK, Assistant Examiner

U.S. Cl. X.R.

317—235; 136—89, 206; 313—108; 250—211